United States Patent [19]

Hama et al.

[11] Patent Number: 4,730,085
[45] Date of Patent: Mar. 8, 1988

[54] GAS INSULATED ELECTRICAL APPARATUS WITH PARTICLE TRAPS

[75] Inventors: Hiroyuki Hama; Hiroshi Yamamoto, both of Amagasaki, Japan

[73] Assignee: Mitsubishi Denki Kabushiki Kaisha, Japan

[21] Appl. No.: 11,756

[22] Filed: Feb. 6, 1987

[30] Foreign Application Priority Data

Feb. 7, 1986 [JP] Japan .................... 61-23994

[51] Int. Cl.⁴ .............................. H02G 5/06
[52] U.S. Cl. ................ 174/14 R; 174/22 C; 174/28
[58] Field of Search ........... 174/14 R, 16 B, 21 C, 174/22 C, 27, 28, 99 R, 99 B

[56] References Cited

U.S. PATENT DOCUMENTS

| | | | |
|---|---|---|---|
| 3,809,795 | 5/1974 | Olsen et al. | 174/99 R X |
| 3,898,367 | 8/1975 | Nakata | 174/14 R |
| 4,496,789 | 1/1985 | Itaka et al. | 174/22 C |

FOREIGN PATENT DOCUMENTS

| | | | |
|---|---|---|---|
| 2475788 | 8/1981 | France | 174/28 |
| 53-132791 | 11/1978 | Japan | 174/14 R |
| 54-159644 | 12/1979 | Japan | 174/28 |
| 55-18840 | 2/1980 | Japan | 174/14 R |

OTHER PUBLICATIONS

"Improved Structure Avoiding Local Field Intensification on Spacers in SF₆ Gas", *IEEE Transactions on Power Apparatus and Systems*, vol. PAS-102, Number 1, Jan. 1983, pp. 250-254.

*Primary Examiner*—Laramie E. Askin
*Attorney, Agent, or Firm*—Leydig, Voit & Mayer

[57] ABSTRACT

A gas insulated electrical apparatus comprising a hermetic sheath filled with an electrically insulating gas having a plurality of electrically conductive sheath sections including hermetically fastened flanged ends. A high voltage conductor is electrically insulatably supported within the sheath by an electrically insulating spacer which is hermetically and securely held at its outer periphery between the flanged ends of the sheath sections. An electrically conductive trap ring is inserted between at least one of the flanged ends of the sheath sections and the outer periphery of the spacer. The trap ring defines, between the trap ring and the spacer, a low electric field particle trap in which a low electric field is formed and in which electrically conductive particles can be trapped and retained.

7 Claims, 5 Drawing Figures

GAS INSULATED ELECTRICAL APPARATUS WITH PARTICLE TRAPS

BACKGROUND OF THE INVENTION

The present invention relates to a gas insulated electrical apparatus, and more particularly to a gas insulated electrical apparatus having a particle trap which is a low potential region inside of the hermetic sheath.

FIG. 1 illustrates, in section, one example of a conventional gas insulated electrical apparatus and FIG. 2 illustrates, in section, a sealing structure for hermetically sealing sheaths of the gas insulated electrical apparatus.

Referring to the figures, the conventional gas insulated electrical apparatus comprises a metallic hermetic sheath 1 which is grounded, a high voltage conductor 2, an insulating spacer 3 for insulatably supporting the high voltage conductor 2 within the sheath 1. The hermetic sheath 1 comprises a plurality of sheath sections 1a hermetically connected to each other by means of sealing structures which will be described in more detail later. The high voltage conductors 2 each disposed within each section 1a of the sheath 1 are connected by connectors 4 having shields 5 for shielding each connector 4. An electrically insulating compressed gas 6 is confined within each section 1a of the divided metallic sheath 1.

The gas insulated electrical apparatus further comprises a plurality of sealing structures for hermetically connecting the divided metallic sheath sections 1a to each other. Each sealing structure comprises two flanges 8 integrally formed with the metallic sheath section 1a, and the circumferential flange portion of the insulating spacer 3. The flanges 8 and the insulating spacer 3 have through holes formed in the axial direction thereof and a bolt 9 is inserted into the through holes for hermetically joining them with a nut 9a which is in engagement with the bolt 9.

Each flange 8 is provided on the side surface thereof where the insulating spacer 3 comes in contact with the flange 8 with an annular groove 10 for receiving an O-ring 11 therein. When the flanges 8 and the insulating spacer 3 disposed between the flanges 8 are joined by the bolts 9, each metallic sheath 1 is hermetically sealed by the O-ring 11 in each groove 10 to thereby confine the compressed gas 6 within each sheath section 1a.

However, the thus constructed conventional sheath 1 has problems in that it is difficult to machine the flanges 8 because they are integrally formed with the sheath section 1a. When electrically conductive foreign matters such as metallic powder and dust are present in the sheath 1, the electrically conductive particles adhere to the connecting portion between the flanges 8 and the insulating spacer 3, thereby causing the withstand voltage characteristics of the sheath 1 to be reduced.

SUMMARY OF THE INVENTION

Accordingly, an object of the present invention is to provide a gas insulated apparatus free from the above discussed problems.

With the above object in view, the gas insulated electrical apparatus of the present invention comprises a hermetic sheath having a plurality of electrically conductive sheath sections including a flanged end and fastening means for fastening the flanged ends of the sheath sections together. A high voltage conductor is electrically insulatably supported with the sheath by an electrically insulating spacer which is hermetically and securely held at its outer periphery between the flanged ends of the sheath sections. An electrically insulating gas is disposed within the hermetic sheath. An electrically conductive tray ring is interposed between at least one of the flanged ends of the sheath sections and the outer periphery of the spacer. The trap ring defines, between the trap ring and the spacer, a low electric field particle trap in which electrically conductive particles can be trapped and retained.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Figure 3:
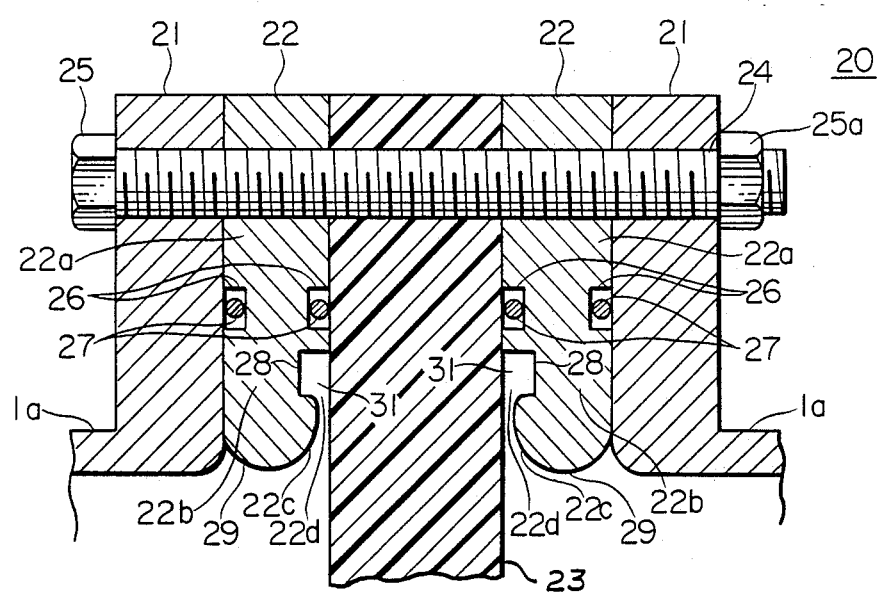
FIG. 3 is an enlarged sectional view of a sealing structure for hermetically connecting sheath sections according to an embodiment of the present invention.

FIG. 3 illustrates, in an enlarged sectional view, a sealing structure 20 for hermetically connecting sheath sections 1a of a gas insulated electrical apparatus according to one embodiment of the present invention.

Figure 1:
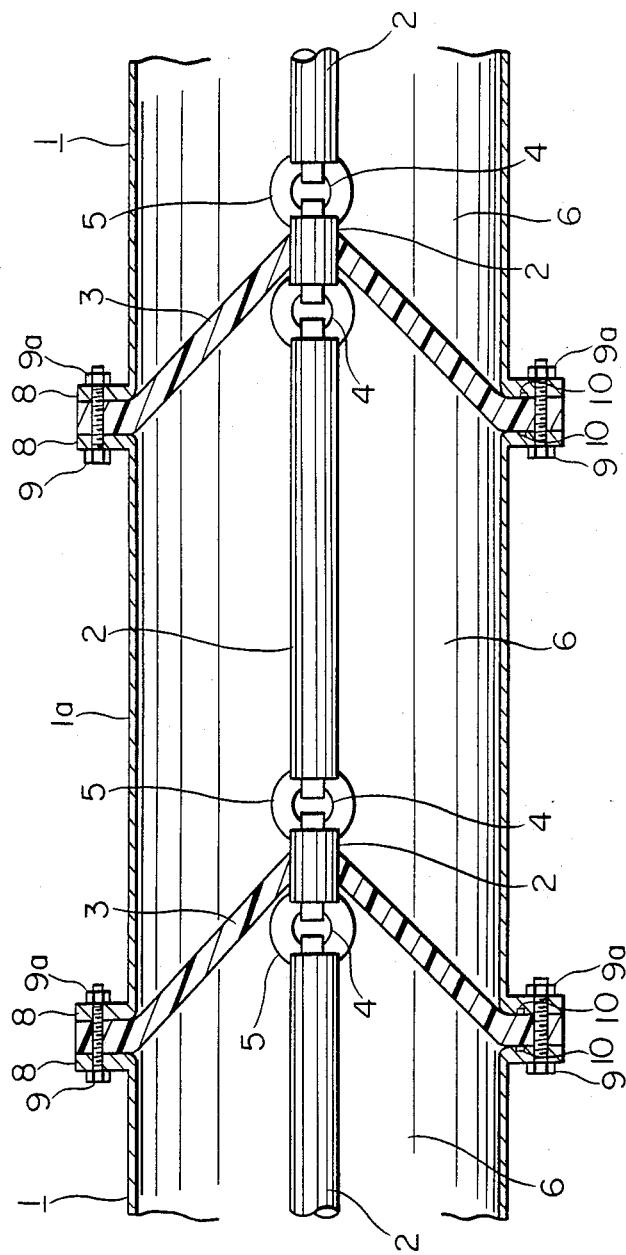
FIG. 1 is a longitudinal sectional view of a conventional gas insulated electrical apparatus.
Figure 2:
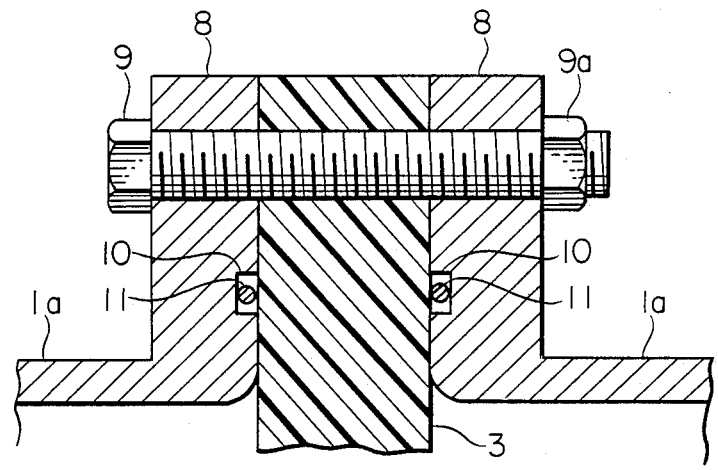
FIG. 2 is an enlarged sectional view showing a sealing structure for connecting sheath sections for use in the gas insulated electrical apparatus of FIG. 1.

The gas insulated electrical apparatus according to the present invention is substantially the same as the conventional apparatus shown in FIG. 1 except for the sealing structure.

According to one embodiment of the present invention illustrated in FIG. 3, the sealing structure 20 comprises flanges 21 integrally formed at both ends of each section 1a of the metallic sheaths 1, a pair of doughnut shaped metallic trap rings 22, each of which has a substantially rectangular cross section. The trap ring 22 comprises a ring body 22a at which the trap ring 22 is secured between the spacer 23 and the flanged end 21 of the sheath sections 1a. A reduced thickness radial extension 22b is formed on the inner periphery of the ring body 22a to radially inwardly extend toward the inside of the sheath 1. The trap ring 22 also comprises an annular axial extension 22c extending in the axial direction from the inner periphery of the radial extension 22b toward the spacer 23 so that an annular gap 22d is defined between the tip of the radial extension 22b and the side face of the spacer 23. The trap rings 22 are disposed on both sides of the insulating spacer 23 and sandwiched between the flanges 21. The flanges 21, the metallic ring 22 and the insulating spacer 23, each has a through hole 24 formed in the axial direction thereof, into which a bolt 25 is inserted and a nut 25a is screwed onto for joining these three members of the sealing structure 20. Each metallic ring 22 is provided on each side thereof with an annular groove 26 in which an O-ring 27 is retained for hermetically sealing each section of the divided sheaths 1, when they are assembled.

In other words, the metallic ring 22 is provided on one side thereof, which faces the side surface of the insulating spacer 23, with an annular recess 28. The metallic ring 22 is further provided at the inner circumferential end thereof with a rounded member 29 having a predetermined curvature and one side portion of the rounded member 29 projects towards the side surface of the insulating spacer 23 so as to form a narrow path therebetween when the metallic ring 22 is joined to the insulating spacer 23. Accordingly, the annular recess 28 forms a small annular chamber or space or money-pouch-like-space 31 which has an opening facing towards the inside of the sheath 1, thereby providing a low electric field region within the small annular space 31, so that, if any loose particles such as metallic powder and dust are present in the sealed sheath 1, i.e. which may be introduced during assembling, the particles are captured due to the inherent characteristics of the electric field in the annular space 31 and it is difficult for the particles to escape therefrom. Thus, this low electric field region can be referred to as a particle trap.

An advantageous effect of the gas insulated electrical apparatus according to the present invention is that the metallic ring 22 can be produced separately from the other components of the apparatus, such as large sheath sections, resulting in an easier workability and in a low cost product.

Figure 4:
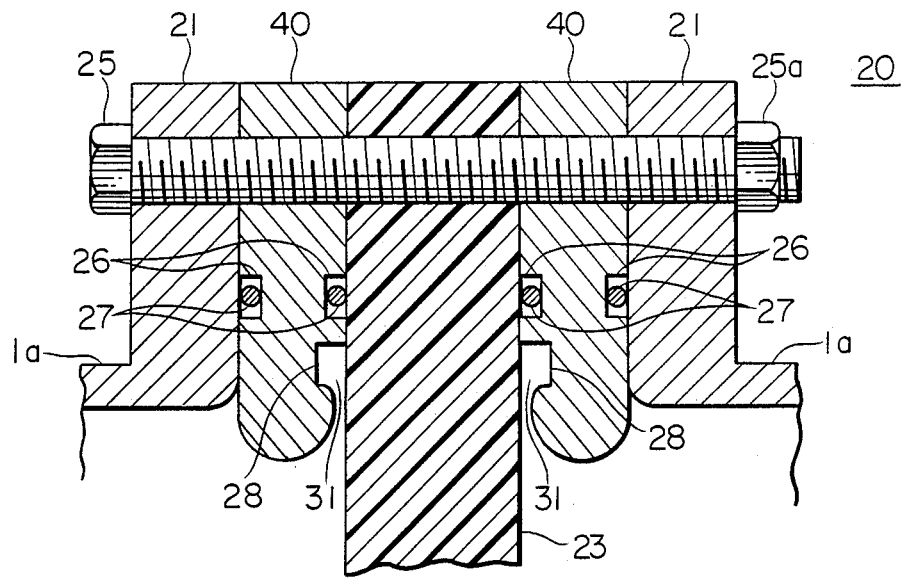
FIG. 4 is an enlarged sectional view of a sealing structure for connecting sheath sections according to another embodiment of the present invention.

According to another embodiment illustrated in FIG. 4, the sealing structure 20 includes metallic rings 40, each having a smaller inner diameter than the inner diameter of the flange 21, thereby allowing the electric field of the contacting portion between the insulating spacer 23 and the metallic rings 40 to be further reduced, so that the withstand voltage characteristics of the sheath 1 are further improved.

Figure 5:
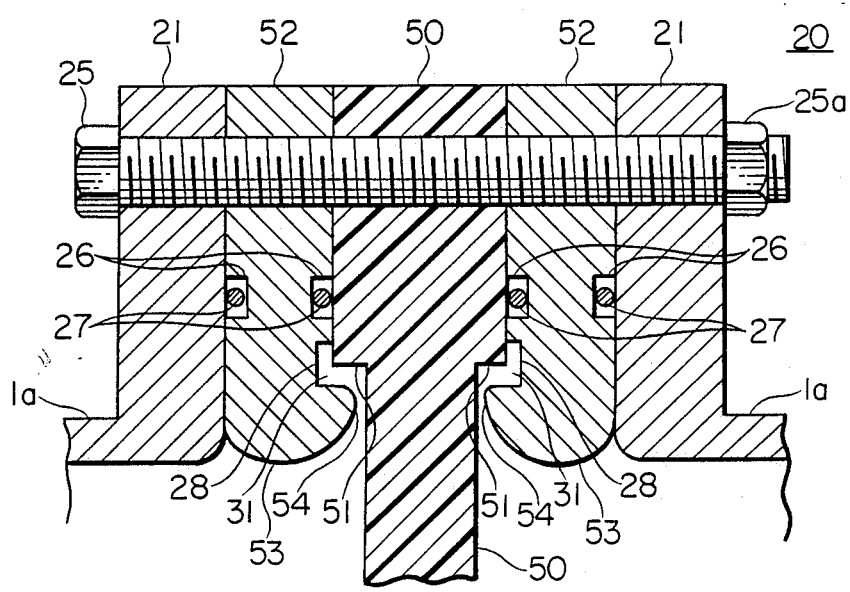
FIG. 5 is an enlarged sectional view of a sealing structure for connecting sheath sections according to still another embodiment of the present invention.

According to still another embodiment illustrated in FIG. 5, the sealing structure 20 includes an insulating spacer 50 having formed at the flange portion thereof shoulders 51, and metallic rings 52, each being provided at one side of the inner circumferential rounded end portion 53 thereof with a projection 54 which further diametrically projects towards the side surface of a thin portion of the insulating spacer 50, when compared with the ring 40 shown in FIG. 4, thereby providing a lower electric field region than the region 31 of the above-disclosed embodiments shown in FIGS. 3 and 4.

As can be seen from the above description, according to the present invention, the sealing structure for hermetically sealing the metallic sheath 1 comprises a pair of metallic rings sandwiched between the flanges and disposed in contact with insulating spacer, each being provided, at the side portion thereof, where the insulating spacer comes in contact with the rings when the gas insulated electrical apparatus is assembled, with an annular small space or money-pouch-like-space which has an opening facing towards the inside of the sheath, thereby providing a low electric field region therein. Accordingly, even when impurities or electrically conductive particles such as metallic powder or dust are present in the sealed metallic sheath, they are captured in the low electric field region, thereby preventing the withstand voltage characteristics of the metallic sheath from being deteriorated. Furthermore, the metallic ring can be produced apart from the other components of the gas insulated electrical apparatus, resulting in an amelioration of workability and a low cost gas insulated electrical apparatus.

What is claimed is:

1. A gas insulated electrical apparatus comprising:
   a hermetic sheath having a plurality of electrically conductive sheath sections each including flanged ends;
   a high voltage conductor disposed within said sheath;
   an electrically insulating spacer for electrically insulatably supporting said conductor relative to said sheath, said spacer having an outer circular periphery of a diameter which is substantially the same as the diameter of said flanged ends of said sheath sections;
   a pair of electrically conductive trap rings interposed between adjacent flanged ends of said sheath sections and said outer periphery of said spacer, each said trap ring defining, between each said trap ring and said spacer, a low electric field particle trap in which electrically conductive particles can be retained;
   through hole fastening means for fastening said flanged ends of said sheath sections, a portion of each of said trap rings and said outer periphery of said spacer thereof;
   an electrically insulating gas disposed within said sheath; and
   an inner periphery of each of said trap rings having a substantially rounded cross-section to moderate the concentration of the electric field.

2. A gas insulated electrical apparatus as claimed in claim 1 wherein each said trap ring comprises a ring body portion at which said trap ring is secured between said spacer and the adjacent flanged end of a sheath section, an annular groove formed in the wall of said trap ring which faces said insulating spacer to form a small annular chamber, the rounded cross-section inner periphery of the trap ring being curved to provide an entrance to the annular chamber which is narrower than the chamber.

3. A gas insulated electric apparatus as claimed in claim 2 wherein each trap ring has formed in each of its said faces of said body portion an annular groove in which a seal ring is inserted.

4. A gas insulated electrical apparatus as claimed in claim 2 wherein said through hole fastening means comprises through holes in said body portion of said trap rings, said flanged ends, and the periphery of said spacer, a bolt through said through hole and a nut on the bolt in clamping relationship.

5. A gas insulated electrical apparatus as claimed in claim 1, wherein each said trap ring has an inner diameter substantially equal to the inner diameter of said sheath sections.

6. A gas insulated electrical apparatus as claimed in claim 1, wherein each said trap ring has an inner diameter smaller than the inner diameter of said sheath sections.

7. A gas insulated electrical apparatus as claimed in claim 1 wherein said insulating spacer has an annular thick portion at its outer periphery and a thin portion at its inner periphery forming a lip where said thick portion joins said thin portion, said trap rings are secured between said thick portion of said spacer and said flanged ends, and an annular axial extension of each trap ring extends toward said thin portion of said spacer.

* * * * *